United States Patent
Lesniak

(10) Patent No.: US 12,493,286 B2
(45) Date of Patent: Dec. 9, 2025

(54) SYSTEM AND COMPUTER-IMPLEMENTED METHOD FOR CONTROLLING A ROTARY MILKING PARLOR ARRANGEMENT AND COMPUTER PROGRAM

(71) Applicant: DELAVAL HOLDING AB, Tumba (SE)

(72) Inventor: Tomasz Lesniak, Tumba (SE)

(73) Assignee: DeLaval Holding AB, Tumba (SE)

( * ) Notice: Subject to any disclaimer, the term of this patent is extended or adjusted under 35 U.S.C. 154(b) by 621 days.

(21) Appl. No.: 17/913,412

(22) PCT Filed: May 17, 2021

(86) PCT No.: PCT/SE2021/050467
§ 371 (c)(1),
(2) Date: Sep. 21, 2022

(87) PCT Pub. No.: WO2021/235996
PCT Pub. Date: Nov. 25, 2021

(65) Prior Publication Data
US 2023/0146995 A1    May 11, 2023

(30) Foreign Application Priority Data
May 20, 2020    (SE) .................... 2050591-3

(51) Int. Cl.
*A01K 1/00*     (2006.01)
*A01K 1/12*     (2006.01)
*G05B 23/02*    (2006.01)

(52) U.S. Cl.
CPC .......... *G05B 23/027* (2013.01); *A01K 1/0041* (2013.01); *A01K 1/126* (2013.01)

(58) Field of Classification Search
None
See application file for complete search history.

(56) References Cited

U.S. PATENT DOCUMENTS

| 5,453,053 A | 9/1995 | Danta et al. |
| 8,087,383 B2 * | 1/2012 | Teckentrup ............ A01K 1/126 |
| | | 119/14.04 |

(Continued)

FOREIGN PATENT DOCUMENTS

| EP | 2 060 173 | 5/2009 |
| JP | H03-19636 | 1/1991 |

(Continued)

OTHER PUBLICATIONS

International Search Report dated Sep. 9, 2021, for PCT/SE2021/050467, 4 pp.

(Continued)

*Primary Examiner* — Ariel Mercado-Vargas
(74) *Attorney, Agent, or Firm* — NIXON & VANDERHYE

(57) ABSTRACT

A control unit obtains a respective first state of a first operation parameter of each drive unit of a rotary milking parlor in a first mode of operation, and a second state of the first operation parameter during operation of the rotating platform in a second mode of operation. For each drive unit, the control unit compares the first and second states of the first operation parameter with one another and when, for one or more detected drive units, a difference between the first and second states does not exceed a threshold level, the control unit generates a first alarm with respect to the one or more detected drive units.

17 Claims, 3 Drawing Sheets

(56) References Cited

U.S. PATENT DOCUMENTS

| | | | | |
|---|---|---|---|---|
| 8,117,988 | B2* | 2/2012 | Oliver | F16C 13/00 |
| | | | | 119/14.04 |
| 9,367,881 | B2* | 6/2016 | Nyberg | A01K 11/006 |
| 2009/0145364 | A1* | 6/2009 | Hardy | A01K 1/126 |
| | | | | 119/524 |
| 2010/0147221 | A1* | 6/2010 | Holscher | A01K 1/126 |
| | | | | 119/14.08 |
| 2011/0308468 | A1* | 12/2011 | Esch | A01K 1/126 |
| | | | | 119/14.08 |
| 2012/0132142 | A1* | 5/2012 | Holmgren | A01K 1/0029 |
| | | | | 119/14.08 |
| 2012/0199073 | A1* | 8/2012 | Hofman | A01K 1/126 |
| | | | | 119/14.08 |
| 2012/0210938 | A1* | 8/2012 | Hofman | A01J 7/04 |
| | | | | 119/14.08 |
| 2013/0153360 | A1* | 6/2013 | Obermuller | A01K 1/126 |
| | | | | 192/129 R |
| 2016/0278340 | A1 | 9/2016 | Courtemanche | |
| 2017/0086419 | A1* | 3/2017 | Krone | A01J 5/0175 |
| 2017/0282868 | A1 | 10/2017 | Mondro et al. | |
| 2019/0373850 | A1 | 12/2019 | Mcdougal | |

FOREIGN PATENT DOCUMENTS

| | | |
|---|---|---|
| NZ | 270955 | 11/1996 |
| WO | 2007/117162 | 10/2007 |
| WO | 2008/002253 | 1/2008 |
| WO | 2015/167390 | 11/2015 |
| WO | 2019/053701 | 3/2019 |
| WO | 2020/021521 | 1/2020 |

OTHER PUBLICATIONS

Written Opinion of the ISA dated Sep. 9, 2021, for PCT/SE2021/050467, 6 pp.

Swedish Search Report dated Dec. 17, 2020, for SE 2050591-3, 3 pp.

* cited by examiner

SYSTEM AND COMPUTER-IMPLEMENTED METHOD FOR CONTROLLING A ROTARY MILKING PARLOR ARRANGEMENT AND COMPUTER PROGRAM

CROSS-REFERENCE TO RELATED APPLICATION(S)

This application is the U.S. national phase of International Application No. PCT/SE2021/050467 filed May 17, 2021, which designated the U.S. and claims priority to SE 2050591-3 filed May 20, 2020, the entire contents of each of which are hereby incorporated by reference.

TECHNICAL FIELD

The present invention relates generally to solutions in which animals are located on a rotating platform while being milked. Especially, the invention relates to a system for operating a rotating platform of a rotary milking parlor arrangement and a computer-implemented method for such a system. The invention also relates to a corresponding computer program for the method.

BACKGROUND

Today's automatic milking arrangements are highly complex installations. In particular, a rotary milking parlor arrangement is one such example. Namely, here, a very heavy platform carrying a large number of animals rotates while milking machines milk the animals located thereon. Many powerful electric motors are required to effect the rotation of the platform. For example to adjust the rotation speed based on the milking characteristics of the animals currently on the platform, these motors must also be controllable with very high accuracy. Moreover, in case of an accident or a malfunction, it must be possible to stop and/or reverse the rotation of the platform as soon as possible.

Typically, one or more friction drive wheels are arranged below the platform, which wheels act on a drive surface of the platform to make it rotate. For the desired control, an integrated brake system may also be employed, for example as described in U.S. 2016/0278340. WO 2020/021521 discloses an example of another control solution. Here, an optimal angular velocity of the milking platform is computed to maximize the number of animals milked per unit of time. EP 2 060 173 shows a design, where the movement of the platform is varied in response to a current performance of a milking robot servicing the milking stalls on the platform.

The applicant has found that the efficiency and reliability of the rotary milking parlor arrangement can be improved if the drive mechanism is organized in one or more drive units that are arranged underneath the rotating platform to rotate the same. Each drive unit, in turn, may either include a single drive motor or a pair of drive motors cooperating with one another to reduce the slippage relative to a drive rail.

If a drive unit fails, for example due to drive motor breakdown, drive wheel or transmission/gear box malfunction, the overall possibilities to control the rotating platform deteriorates. In particular, retarding its movement can be made less efficient. In other words, from a given speed, it will take longer time to stop the platform. Of course, this has negative effects on the safety for both personnel and animals.

SUMMARY

The object of the present invention is therefore to offer a solution that provides an early notification of any malfunctioning drive units, so that appropriate safety measures can be taken.

According to one aspect of the invention, the object is achieved by a system for operating a rotary milking parlor arrangement that includes a rotating platform with a plurality of stalls each of which is configured to house a respective animal during milking. The arrangement includes one or more drive units configured to cause the rotating platform to move in at least a first direction of rotation around a rotation axis. The system includes a control unit, which is configured to obtain a respective first state of a first operation parameter of each of the drive unit(s) during operation of the rotating platform in a first mode of operation. The control unit is also configured to obtain a respective second state of the first operation parameter of each of the drive unit(s) during operation of the rotating platform in a second mode of operation. For example, the control unit may thus obtain information about a respective electric current to or torque of each drive unit in an idle mode and in steady-state operation respectively. The control unit is further configured to compare, for each of the drive unit, the first and second states of the first operation parameter with one another; and if, for one or more detected drive units a difference between the first and second states does not exceed a threshold level, the control unit is configured to generate a first alarm with respect to the one or more detected drive units. In other words, if for example, the electric current to or torque of a particular drive unit is almost the same in idle mode as in steady-state operation, this drive unit is most probably defective—a circumstance that should be indicated by the first alarm.

The above system is advantageous because it enables identifying faulty drive units in a straightforward and reliable manner. Thus, appropriate measures can be taken to compensate for and mitigate the effects of any faulty drive units, for example by preventing operation of the rotating platform or reducing a maximum steady-state speed on each drive unit to compensate for a longer braking time resulting from the faulty drive unit(s) and/or issuing an inspection/service alarm on the faulty drive unit(s). The identification of any faulty drive unit with the first alarm can also be regarded as a software disengagement of any malfunctioning drive units in the meaning that the control unit cannot rely on the malfunctioning drive units in controlling the speed of the rotating platform. Namely, for each non-properly working drive unit, the capacity to operate, accelerate and retard/brake the rotating platform deteriorates. The braking capacity is here the most critical aspect from a safety point-of-view.

The first alarm not only involves an indication of a malfunctioning drive motor or transmission/gear box. Instead, depending on the situation, the first alarm may simply involve an indication of a worn-out drive wheel or a non-properly engaged drive wheel. In some types of rotary milking parlor arrangements, the drive units are manually turned into and secured in a position where the drive wheels engage a drive surface on the rotating platform. The system hereby also enables an identification of any improperly secured drive units.

According to one embodiment, each of the at least one drive unit contains at least one drive motor arranged to engage a drive surface of the rotating platform and, via at least one drive wheel act on the drive surface so as to cause the rotating platform to perform said movement, and the control unit, in response to the first alarm, is further configured to either prevent operation of the rotating platform or reduce a maximum steady-state speed of the rotating platform, and/or issue an inspection/service alarm on the faulty drive unit(s). Preferably, the rotary milking parlor arrangement hereby includes at least two such drive units. Accordingly, if one of the drive units is not working properly, the rotary milking parlor arrangement can remain in operation, while the maximum steady-state speed on the working drive unit(s) (including the faulty drive unit) is reduced for safety reasons. In other words, the rotating platform is not necessarily shut-down in response to the alarm indicating the faulty drive unit. The rotary milking parlor arrangement typically includes a higher number of drive units, such as any number from five to sixteen drive units, so the maximum allowed steady-state speed can be reduced stepwise in response to an increased number of indicated faulty drive units.

Each drive unit may include a single drive motor arranged to engage the drive surface of the rotating platform in a non-disengageable manner. In such a case, the drive unit is preferably manually secured in an position where the drive wheel engages the drive surface of the rotating platform. In other words, the non-disengageable manner hereby means that the drive unit cannot be (automatically) disengaged during operation of the rotary milking parlor arrangement. However, the drive unit can be manually disengaged after stopping the rotating platform.

Alternatively, each of the at least one drive unit may contain first and second drive motors arranged to engage two of said drive surfaces in the form of a drive rail of the rotating platform and, via respective drive wheels act on a respective side of the drive rail so as to cause the rotating platform to perform said movement. Thus, the first and second drive motors cooperate in an efficient manner.

According to one embodiment, in response to the first alarm, the control unit is further configured to send a first control signal to the one or more detected drive units, which first control signal is configured to cause the one or more detected drive units to be automatically/physically disengaged from the drive rail. This is beneficial because if one of the first and second drive motors works satisfactory while the other stands still, the opposing sides of the drive rail experience different degrees of resistance. This, in turn, may lead to the rotating platform derailing, which is both hazardous and costly.

According to a further embodiment, the first mode of operation involves operating the at least one drive unit in an idle mode in which no drive motor of any of the at least one drive unit is engaged to cause the rotating platform to move in the at least first direction of rotation around the rotation axis; and the second mode of operation involves operating the at least one drive unit in a steady-state mode in which the at least one drive unit is engaged to cause the rotating platform to move at a steady-state speed in the at least first direction of rotation around the rotation axis. Accordingly, the first operation parameter (such the current or torque) of the drive motor(s) is/are obtained/recorded when running the drive motor(s) in the non-engaged idle mode, whereby the first operation parameter (such as the current or torque) of the drive motor(s) obtained in the steady-state mode is/are compared with the reference values obtained in idle mode to determine if any drive motor(s) is/are malfunctioning.

According to another embodiment, the first mode of operation involves operating the at least one drive unit in a non-engaged ramp-up mode in which no drive motor of any of the at least one drive unit is engaged to cause the rotating platform to accelerate toward a steady-state speed in the at least first direction of rotation around the rotation axis; and the second mode of operation involves operating the at least one drive unit in an engaged ramp-up mode in which the at least one drive unit is engaged to cause the rotating platform to accelerate toward the steady-state speed in the at least first direction of rotation around the rotation axis. Accordingly, the first operation parameter (such the current or torque) of the drive motor(s) is/are obtained/recorded when running the drive motor(s) in the non-engaged (non-loaded) ramp-up operation to desired steady-state speed, wherein the first parameter can be used as reference values that may be plotted on reference curve, which is subsequently compared with the values/curve of the first parameter in the engaged ramp-up operation as the rotating platform is accelerated (from standstill) to the desired steady-state speed. Consequently, if the difference between the first and second states does not exceed the threshold level, the control unit is configured to generate the first alarm with respect to the one or more detected drive units during the ramp-up operation.

According to another embodiment, the arrangement includes at least three drive units. Here, if the difference between the first and second states exceeds the threshold level for each of the at least three drive units. I.e. the first checkpoint is passed, the control unit is further configured to, during operation of the rotating platform in the second mode of operation, obtain the first operation parameter for each of the at least three drive units, for instance the magnitude of the torque of each drive unit or the electric current fed thereto. The control unit is configured to compare, pairwise, the first operation parameter for each drive unit with the first operation parameter for each of the other drive units to derive a respective first difference value between each combination of drive units. Based on the first difference values, the control unit is configured to determine if the first operation parameter for a particular one of the drive units deviates from the first operation parameter for the other ones of the drive units by more than a first threshold difference. If so, the control unit is configured to generate a second alarm with respect to said particular one drive unit. Thus, a drive unit that shows a deviating performance in the second state (the second mode of operation) can be spotted as faulty. In other words, the embodiment detects a drive unit that may fail during the second mode of operation, e.g. in steady-state operation of the rotating platform.

According to still another embodiment, the control unit is further configured to obtain, during operation of the rotating platform in the second mode of operation, at least one second operation parameter for each of the at least three drive units, e.g. a respective magnitude of a voltage and/or a respective value of a frequency (rpm) thereto. Analogous to the above, the control unit is configured to compare, pairwise, the at least one second operation parameter for each of the drive units with the at least one second operation parameter for each other drive unit to derive a respective at least one second difference value between each combination of drive units. Based on said difference values, the control unit is configured to determine if the second operation parameter for a specific one of the drive units deviates from the second operation parameter for the other ones of the drive units by more than a second threshold difference. If so, the control unit is configured to generate a third alarm with respect to said specific one drive unit. This provides an additional means of detecting defective drive units.

According to another aspect of the invention, the object is achieved by a computer-implemented method of operating a rotary milking parlor arrangement that includes a rotating platform with a plurality of stalls each of which is configured to house a respective animal during milking. It is also presumed that the arrangement includes at least one drive unit configured to cause the rotating platform to move in at least a first direction of rotation around a rotation axis. The method involves obtaining a respective first state of a first operation parameter of each of the at least one drive unit during operation of the rotating platform in a first mode of operation. The method also involves obtaining a respective second state of the first operation parameter of each of the at least one drive unit during operation of the rotating platform in a second mode of operation. For each of the at least one drive unit, the first and second states of the first operation parameter are compared with one another. If, for one or more detected drive units a difference between the first and second states does not exceed a threshold level, the method involves generating a first alarm with respect to the one or more detected drive units. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
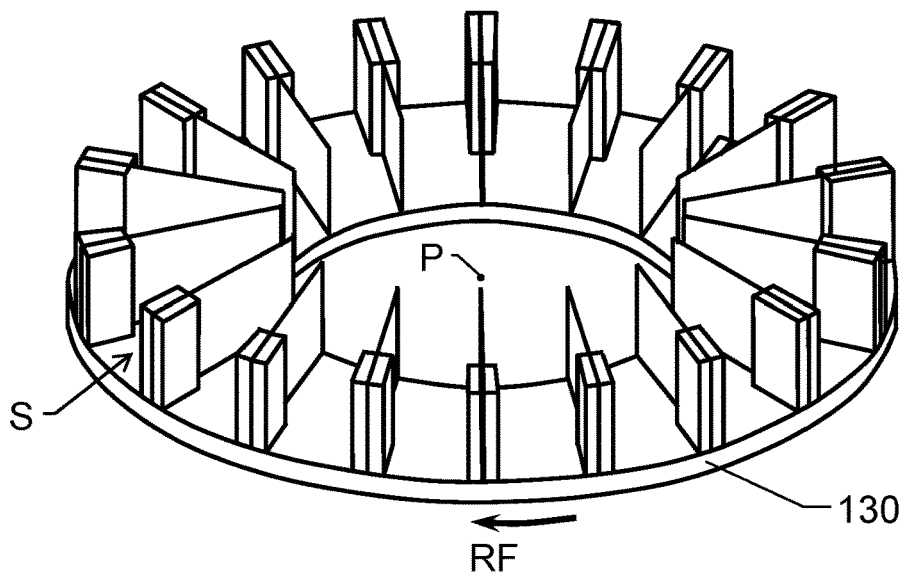
FIG. 1 shows a rotating platform of a rotary milking parlor arrangement according to one embodiment the invention.

FIG. 1 is showing a rotating platform 130, which forms part of a rotary milking parlor arrangement. In this example, the rotating platform 130 has 18 milking stalls S. Of course, however, any higher or lower number of stalls S is conceivable according to the invention. Nevertheless, each stall S is configured to house a respective animal while being milked by a milking machine.

The system according to the invention includes at least one drive unit and a control unit 220. The drive unit(s) cause the rotating platform 130 to move in at least a first direction RF of rotation around a rotation axis P. Depending on the size of the rotating platform 130, the number of drive units may be anything from one and up to for instance sixteen.

Figure 2:
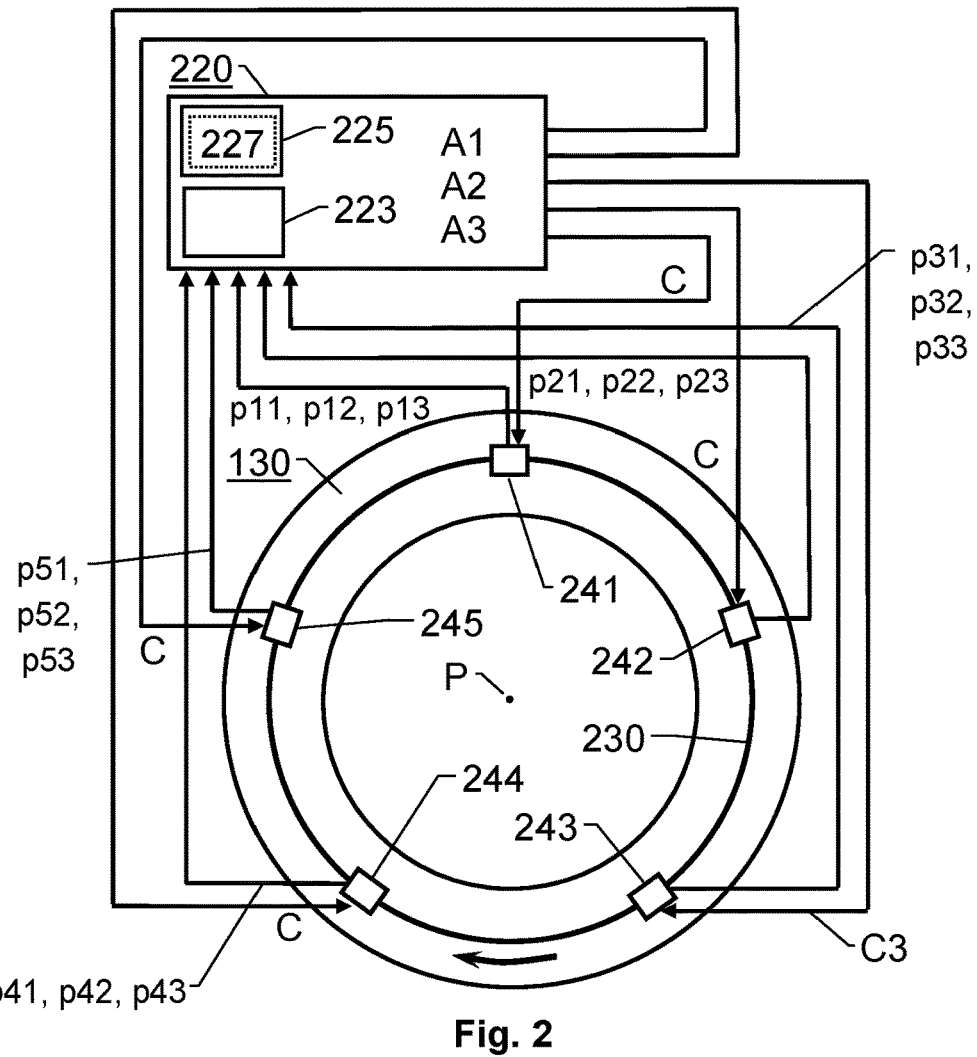
FIG. 2 illustrates a system for operating a rotating platform according to one embodiment the invention.

FIG. 2 illustrates a system according to one embodiment of the invention for operating the rotating platform 130. The system includes a control unit 220, which is configured to obtain a respective first state of a first operation parameter p11, p21, p31, p41 and p51 of each of the drive units 241, 242, 243, 244 and 245 respectively during operation of the rotating platform 130 in a first mode of operation.

The first mode of operation may involve operating the drive units and the rotating platform 130 in an idle mode or non-engaged ramp-up mode in which no drive motor of any of the drive units 241, 242, 243, 244 or 245 is engaged to cause the rotating platform 130 to move in the at least first direction RF of rotation around a rotation axis P. Hence, the drive units are running in idle mode or non-engaged ramp-up mode and the rotating platform is standing still. A second mode of operation may involve operating the drive units and rotating platform 130 in a steady-state mode or engaged ramp-up mode in which the drive units 241, 242, 243, 244 and 245 are engaged to cause the rotating platform 130 to move at or accelerate to a steady speed in the at least first direction RF of rotation around the rotation axis P.

The first operation parameter p11, p21, p31, p41 and p51 may represent a respective magnitude of an electric current fed to each of the drive units 241, 242, 243, 244 and 245 in the first and second states respectively. Alternatively, the first operation parameter p11, p21, p31, p41 and p51 may represent a respective torque of each of the drive units or a respective magnitude of a voltage or a respective value of a frequency fed to each of the drive units 241, 242, 243, 244 and 245.

Nevertheless, the control unit 220 is configured to obtain a respective second state of the first operation parameter p11, p21, p31, p41 and p51 of each of the drive units 241, 242, 243, 244 and 245 during operation of the rotating platform 130 in the second mode of operation.

For each of the drive units 241, 242, 243, 244 and 245, the control unit 220 is configured to compare the first and second states of the first operation parameter p11, p21, p31, p41 and p51 with one another, for example the magnitude of a respective electric current fed to each drive unit in the idle mode and in the steady-state mode. If, for one or more detected drive units, say 241, a difference between the first and second states does not exceed a threshold level, the control unit 220 is configured to generate a first alarm A1 with respect to the one or more detected drive units, here 241.

Generally, according to the invention, the first and second states are selected such that a drive unit operating as intended shows distinctly different values of the first operation parameter p11, p21, p31, p41 and p51 in the first and second states respectively.

According to the invention, each of the drive units 241, 242, 243, 244 and 245 includes at least one drive motor that is arranged to engage a drive surface of the rotating platform 130. The at least one drive motor is therefore mechanically connected to at least one drive wheel, which, in turn, acts on the drive surface so as to cause the rotating platform 130 to perform its rotating movement.

Each drive unit 241, 242, 243, 244 and 245 is configured produce at least one respective signal p11, p12 p13; p21, p22, p23; p31, p32, p33; p41, p42, p43 and p51, p52 p53 indicating a respective first, second and/or third operation parameter of the drive unit in question. The first operation parameter p11, p21, p31, p41 and p51 may represent a respective magnitude of an electric current fed to the drive units 241, 242, 243, 244 and 245 respectively or a respective torque of each of the drive units 241, 242, 243, 244 and 245.

The second operation parameter p12, p22, p32, p42 and p52 may represent a respective magnitude of a voltage fed to drive units 241, 242, 243, 244 and 245 respectively. The third operation parameter p13, p23, p33, p43 and p53 may represent a respective value of a frequency fed to the drive units 241, 242, 243, 244 and 245 respectively.

Figure 3:
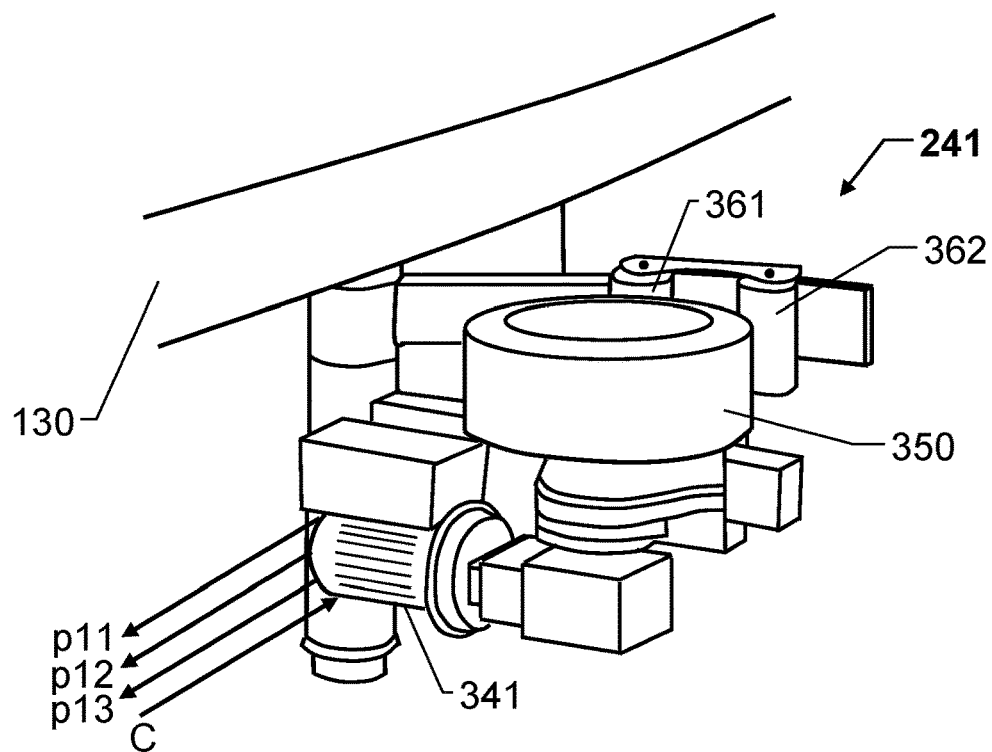
FIG. 3 shows a perspective view of a drive unit according to a first embodiment the invention.

FIG. 3 shows a perspective view of a drive unit 241 according to a first embodiment the invention. Here, the drive unit 241 contains a single drive motor 341 that is arranged to engage drive surface of the rotating platform 130 in a non-disengageable manner as previously described. The drive unit 241 is shown in a non-engaged outer position used for recording the first operation parameter in an idle mode or a non-engaged ramp-up mode. The drive unit 241 may thereafter be secured into engagement by manually turning the drive unit into an inner position and locking an arm equipped with rollers 361 and 362 arranged to press a drive wheel 350 into a secure engagement with the drive surface on the rotating platform 130. Since the drive motor 341 cannot be automatically disengaged from the inner locked or engaged position with the rotating platform 130, a detected malfunction of the drive unit 342 can be considered as a software disengagement. This means that the control unit 220 cannot rely on the drive unit 342 when controlling the rotating platform 130. In particular, in response to the first alarm A1, the control unit 220 may therefore be configured to reduce a maximum allowed steady-state speed of the rotating platform 130 and issue an inspection/service alarm on the drive unit 342 to the operator of the arrangement.

Figure 4:
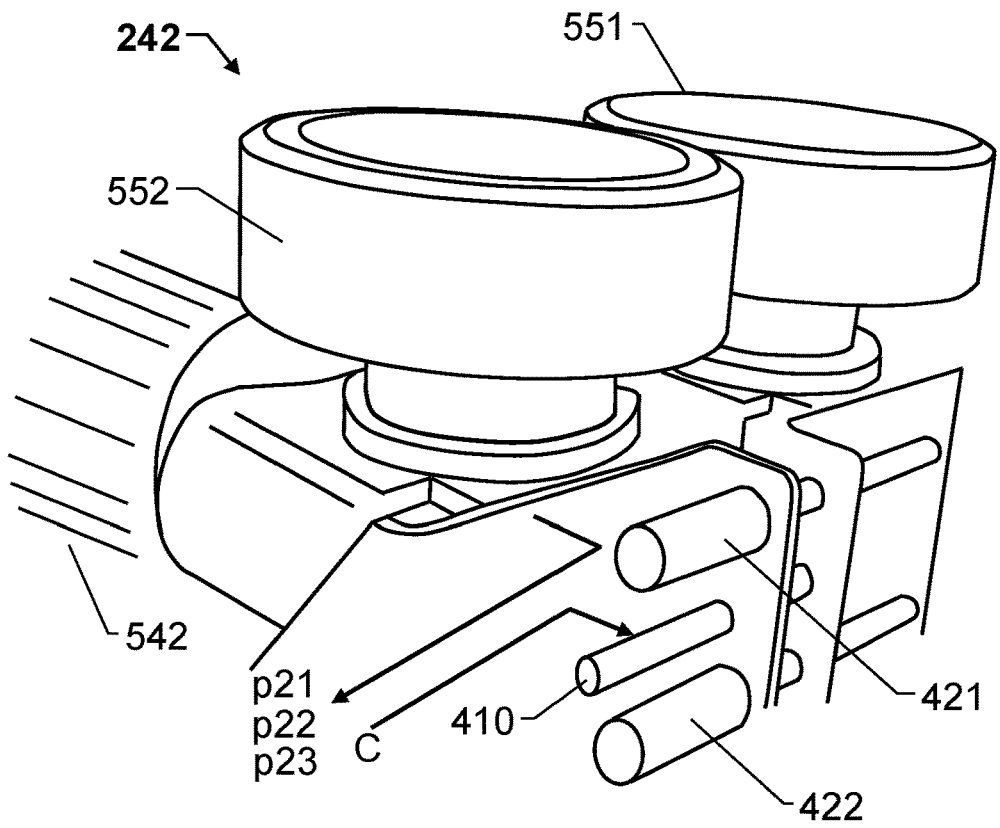
FIG. 4 shows a perspective view of a drive unit according to a second embodiment the invention.

FIG. 4 shows a perspective view of a drive unit 242 according to a second embodiment the invention. Here, the drive unit 242 contains first and second drive motors 541 and 542 respectively (see also FIGS. 5a and 5b) that are arranged to engage a drive rail 230 of the rotating platform 130. Specifically, each of the first and second drive motors 541 and 542 is mechanically connected to a respective drive wheel 551 and 552 that acts on opposing sides of the drive rail 230 so as to cause the rotating platform 130 to perform its rotating movement as described below with further reference to FIGS. 5a and 5b.

In response to the first alarm A1, the control unit 220 is preferably configured to send a first control signal C2 to any drive unit 242 that has been detected as faulty. The first control signal C2 is configured to cause the detected drive unit 242 to be automatically/physically disengaged from the drive rail 230.

Figures 5A, 5B:
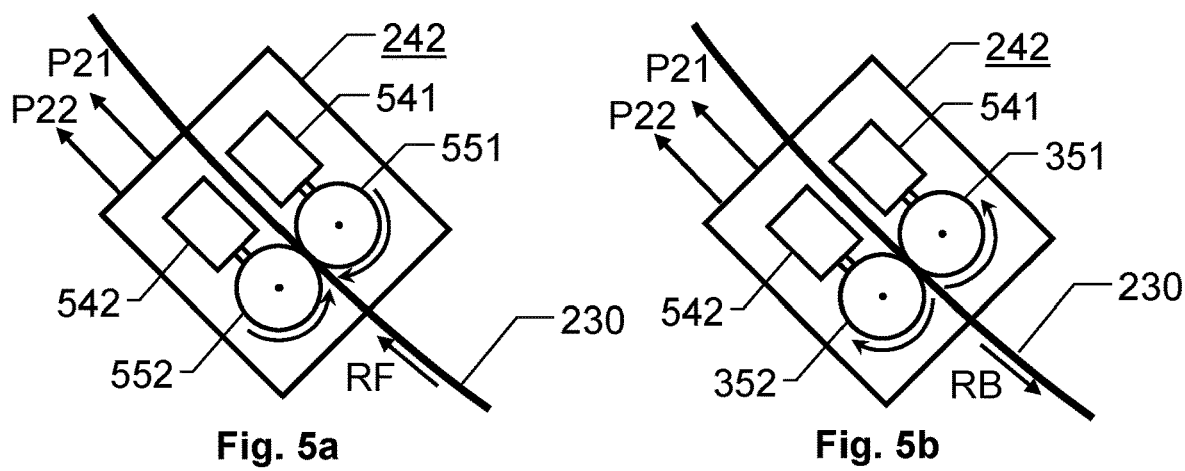
FIGS. 5a-b schematically illustrate the function of the drive unit according to the second embodiment of the invention.

FIGS. 5a and 5b show schematic views of the drive unit 242 according to the second embodiment the invention. FIG. 5a illustrates an operation of the drive unit 242 where the rotating platform 130 is caused to move in a first direction RF, say forward; and FIG. 5b illustrates operation of the drive unit 242 where the rotating platform 130 is caused to move in a second direction RB, say backward. The first and second drive motors 541 and 542 are each arranged to engage a drive surface of the rotating platform 130 in the form of a drive rail 230. The drive rail 230 is preferably located under the rotating platform 130, and the drive rail 230 follows the circular outline of the rotating platform 130.

Referring now again also to FIG. 4, the drive unit 242 includes an actuator 410, which, in response to the control signal C2 is configured to cause the drive unit 242 to be disengaged from the drive rail 230 by separating the first drive wheel 351 from the second drive wheel 352. The actuator 410, in turn, may include a pneumatic cylinder, a hydraulic cylinder or an electric linear motor that is arranged to separate the first and second drive wheels 551 and 552 from one another.

The first drive wheel 551 is arranged on a first side of the drive rail 230, e.g. on the inside of a circular loop formed by the drive rail 230. The first drive wheel 551 is operated by a first drive motor 541 in the drive unit 242. The second drive wheel 552 is arranged on a second side of the drive rail 230, e.g. on the outside of the circular loop, and is operated by a second drive motor 542 in the drive unit 242.

Preferably, the drive unit 242 contains at least one clamping member, which, in an engaged mode, is configured to force the first drive wheel 551 towards the first side of the drive rail 230 and force the second drive wheel 352 towards the second side of the drive rail 230. The embodiment of the invention shown in FIG. 4 has two clamping members 421 and 422 respectively, which can be represented by resilient elements, such as helical and/or leaf springs. Hence, in practice, whenever the actuator 410 is inactivated, the clamping members 421 and 422 press the drive wheels 551 and 552 towards drive rail 230, so that drive wheels 551 and 552 engage the drive wheel and may cause the platform 130 to rotate. Activation of the actuator 410 results in that the entire motor and drive wheel arrangements 541/551 and 542/552 respectively are swung away from one another by rotation around a pivot axis.

According to one embodiment of the invention, the arrangement includes at least three drive units 241, 242, 243, 244 and 245. Here, if the difference between first and second states of the first operation parameter p11, p21, p31, p41 and p51 exceeds the threshold level for each of the at least three drive units 241, 242, 243, 244 and 245, the control unit 220 is configured to execute the following steps.

During operation of the rotating platform 130 in the second mode of operation, here steady-state operation, the control unit 220 is configured to obtain the first operation parameter p11, p21, p31, p41 and p51 for each of the drive units 241, 242, 243, 244 and 245 respectively. The control unit 220 is further configured to compare, pairwise, the first operation parameter p11, p21, p31, p41 and p51 for each of the drive units 241, 242, 243, 244 and 245 with the first operation parameter p11, p21, p31, p41 and p51 for each of the other drive units 241, 242, 243, 244 and 245 to derive a respective first difference value between each combination of drive units of the at least three drive units 241, 242, 243, 244 and 245. Based on the first difference values, the control unit 220 is configured to determine if the first operation parameter for a particular one of the drive units, say 242, deviates from the first operation parameter for the other ones of the drive units 241, 243, 244 and 245 by more than a first threshold difference. If so, it is concluded that the drive unit 242 has an uncharacteristic operational behavior in the second mode of operation, here steady-state operation. Therefore, the control unit 220 is configured to generate a second alarm A2 with respect to the drive unit 242.

Alternatively, or additionally, according to one embodiment of the invention, and provided that the arrangement includes at least three drive units 241, 242, 243, 244 and 245, the control unit 220 is configured to execute the following steps.

During operation of the rotating platform 130 in the second mode of operation the control unit 220 is configured to obtain at least one second operation parameter p12, p22, p32, p42 and p52 for each of the at least three drive units 241, 242, 243, 244 and 245; and compare, pairwise, the at least one second operation parameter p12, p22, p32, p42 and p52 for each of the drive units 241, 242, 243, 244 and 245 with the at least one second operation parameter p12, p22, p32, p42 and p52 for each of the other drive unit 241, 242, 243, 244 and 245 to derive a respective at least one second difference value between each combination of drive units 241, 242, 243, 244 and 245. Based on the difference values, the control unit 220 is configured to determine if the at least one second operation parameter operation parameter p12, p22, p32, p42 and p52 for a specific drive unit, say 243, deviates from the at least one second operation parameter for the other ones of the at least three drive units 241, 242, 244 and 245 by more than a second threshold difference. If so, analogous to the above, this interpreted as a sign of that the drive unit 243 has an uncharacteristic operational behavior in the second mode of operation. Therefore, the control unit 220 is configured to generate a third alarm A3 with respect to the drive unit 243.

It is generally advantageous if the control unit 220 is configured to effect the above-described procedure in an automatic manner by executing a computer program 227. Therefore, the control unit 220 may include a memory unit 225, i.e. non-volatile data carrier, storing the computer program 227, which, in turn, contains software for making processing circuitry in the form of at least one processor 223 in the central control unit 220 execute the above-described actions when the computer program 227 is run on the at least one processor 223.

Figure 6:
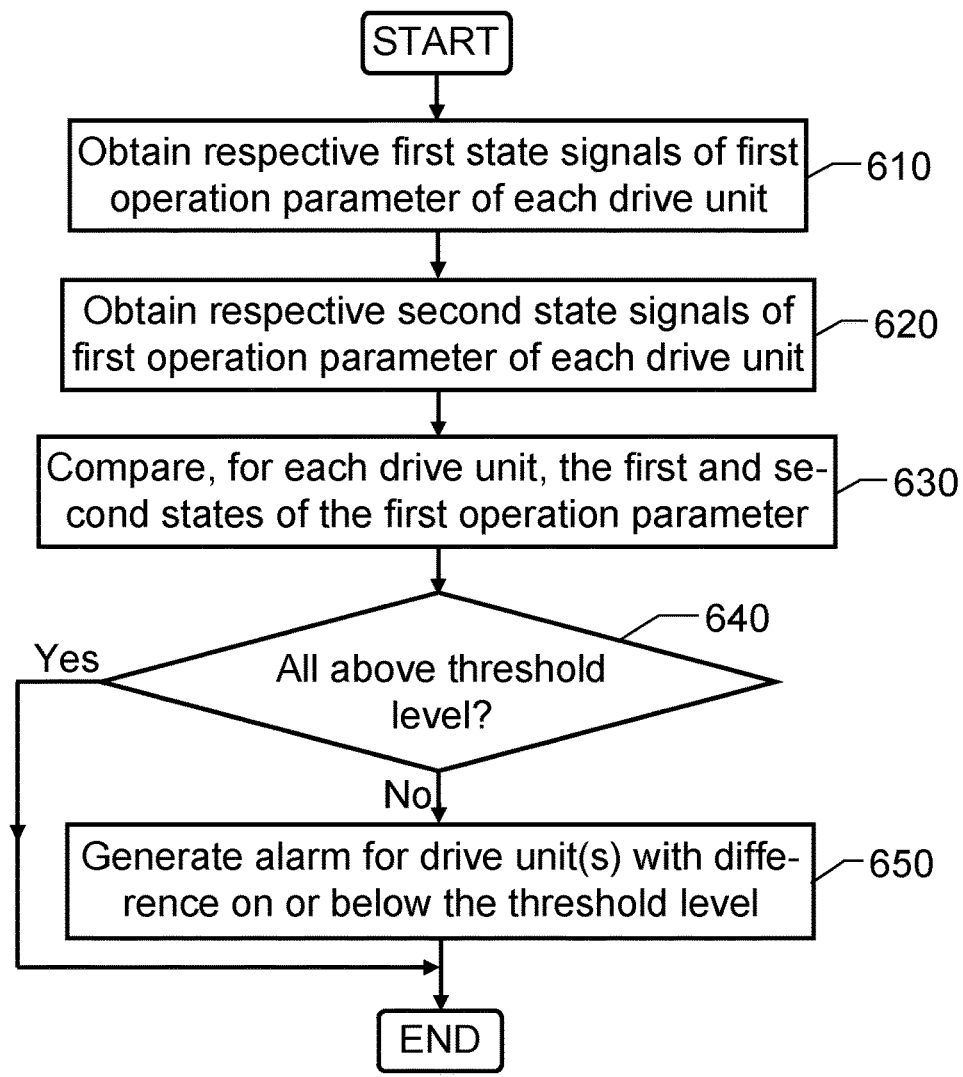
FIG. 6 illustrates, by means of a flow diagram, the general method according to the invention.

In order to sum up, and with reference to the flow diagram in FIG. 6, we will now describe the general computer-implemented method according to the invention of operating a rotating platform of a rotary milking parlor arrangement.

In a first step 610, a respective first state is obtained of a first operation parameter of each drive unit during operation of the rotating platform in a first mode of operation.

Then, in a step 620, a respective second state is obtained of the first operation parameter of each drive unit during operation of the rotating platform in a second mode of operation.

In a subsequent step 630, the first and second states of the first operation parameter are compared with one another for each of the drive units.

Thereafter, in a step 640, it is checked if a respective difference between the first and second states of the first operation parameter is above a threshold for each of the drive units. If so, the procedure ends. Otherwise, a step 650 follows in which a first alarm is generated in respect of each drive unit for which said difference does not exceed the threshold. Then, the procedure ends.

All of the process steps, as well as any sub-sequence of steps, described with reference to FIG. 6 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for operating a rotary milking parlor arrangement that comprises a rotating platform with a plurality of stalls (S), each stall configured to house a respective animal during milking, the rotary milking parlor arrangement further comprising at least one drive unit configured to cause the rotating platform to move in at least a first direction (RF, RB) of rotation around a rotation axis (P), the system comprising a control unit configured to:
    obtain a respective first state of a first operation parameter of each of the at least one drive unit during operation of the rotating platform in a first mode of operation;
    obtain a respective second state of the first operation parameter of each of the at least one drive unit during operation of the rotating platform in a second mode of operation; and
    compare, for each of the at least one drive unit, the first and second states of the first operation parameter with one another, and when, for one or more detected drive units of the at least one drive unit, a difference between said first and second states does not exceed a threshold level, generate a first alarm (A1) with respect to the one or more detected drive units,
    wherein:
    the first mode of operation involves operating the at least one drive unit in an idle mode in which no drive motor of any of the at least one drive unit is engaged to cause the rotating platform to move in the at least first direction (RF, RB) of rotation around the rotation axis (P); and
    the second mode of operation involves operating the at least one drive unit in a steady-state mode in which the at least one drive unit is engaged to cause the rotating platform to move at a steady-state speed in the at least first direction (RF, RB) of rotation around the rotation axis (P).

2. The system according to claim 1 in combination with the rotary milking parlor arrangement, wherein, each of the at least one drive unit comprises at least one drive motor arranged to engage a drive surface of the rotating platform and, via at least one drive wheel act on the drive surface so as to cause the rotating platform to perform said movement, and the control unit, in response to the first alarm (A1), is further configured to perform at least one of:
    prevent operation of the rotating platform,
    reduce a maximum steady-state speed of the rotating platform, and
    issue an inspection/service alarm.

3. The system and the rotary milking parlor arrangement combination according to claim 2, wherein, each of the at least one drive unit comprises a single drive motor arranged to engage the drive surface of the rotating platform in a non-disengageable manner.

4. The system and the rotary milking parlor arrangement combination according to claim 2, wherein, each of the at least one drive unit comprises first and second drive motors arranged to engage two of said drive surfaces in the form of a drive rail of the rotating platform and, via respective drive wheels, act on a respective side of the drive rail so as to cause the rotating platform to perform said movement.

5. The system and the rotary milking parlor arrangement combination according to claim 4, wherein, in response to the first alarm (A1), the control unit is further configured to:
send a first control signal (C2) to the one or more detected drive units, which first control signal (C2) is configured to cause the one or more detected drive units to be disengaged from the drive rail.

6. The system according to claim 1, wherein:
the first mode of operation involves operating the at least one drive unit in a non-engaged ramp-up mode in which no drive motor of any of the at least one drive unit is engaged to cause the rotating platform to accelerate toward a steady-state speed in the at least first direction (RF, RB) of rotation around the rotation axis (P); and
the second mode of operation involves operating the at least one drive unit in an engaged ramp-up mode in which the at least one drive unit is engaged to cause the rotating platform to accelerate toward the steady-state speed in the at least first direction (RF, RB) of rotation around the rotation axis (P).

7. The system according to claim 1, wherein the first operation parameter represents a respective magnitude of an electric current fed to each of the at least one drive unit or the torque of each of the at least one drive unit in the first and second states respectively.

8. The system according to claim 1 in combination with the rotary milking parlor arrangement, wherein the rotary milking parlor arrangement comprises at least three drive units, and wherein when the difference between said first and second states exceeds the threshold level for each of the at least three drive units, the control unit is further configured to:
obtain, during operation of the rotating platform in the second mode of operation, the first operation parameter for each of the at least three drive units,
compare, pairwise, the first operation parameter for each of the at least three drive units with the first operation parameter for each of the other drive units of the at least three drive units to derive a respective first difference value between each combination of drive units of the at least three drive units, and based on said first difference values determine when the first operation parameter for a particular one deviates from the first operation parameter for the other ones of the at least three drive units by more than a first threshold difference, and then
generate a second alarm (A2) with respect to said particular one drive unit.

9. The system and the rotary milking parlor arrangement combination according to claim 8, wherein the control unit is further configured to:
obtain, during operation of the rotating platform in the second mode of operation, at least one second operation parameter for each of the at least three drive units,
compare, pairwise, the at least one second operation parameter for each of the at least three drive units with the at least one second operation parameter for each of the other drive units of the at least three drive units to derive a respective at least one second difference value between each combination of drive units of the at least three drive units, and based on said difference values determine when the at least one second operation parameter for a specific one deviates from the at least one second operation parameter for the other ones of the at least three drive units by more than a second threshold difference, and then
generate a third alarm (A3) with respect to said specific one drive unit.

10. The system and the rotary milking parlor arrangement combination according to claim 9, wherein, the second operation parameter represents at least one of a respective magnitude of a voltage and a respective value of a frequency fed to each of the at least one drive unit.

11. A computer-implemented method of operating a rotary milking parlor arrangement that comprises a rotating platform with a plurality of stalls (S), each stall configured to house a respective animal during milking, the rotary milking parlor arrangement further comprising at least one drive unit configured to cause the rotating platform to move in at least a first direction (RF, RB) of rotation around a rotation axis (P), the method comprising:
obtaining a respective first state of a first operation parameter of each of the at least one drive unit during operation of the rotating platform in a first mode of operation;
obtaining a respective second state of the first operation parameter of each of the at least one drive unit during operation of the rotating platform in a second mode of operation; and
comparing, for each of the at least one drive unit, the first and second states of the first operation parameter with one another, and when, for one or more detected drive units of the at least one drive unit, a difference between said first and second states does not exceed a threshold level, generating a first alarm (A1) with respect to the one or more detected drive units,
wherein:
the first mode of operation involves operating the at least one drive unit in an idle mode in which no drive motor of any of the at least one drive unit is engaged to cause the rotating platform to move in the at least first direction (RF, RB) of rotation around the rotation axis (P); and
the second mode of operation involves operating the at least one drive unit in a steady-state mode in which the at least one drive unit is engaged to cause the rotating platform to move at a steady-state speed in the at least first direction (RF, RB) of rotation around the rotation axis (P).

12. The method according to claim 11, wherein, each of the at least one drive unit comprises at least one drive motor arranged to engage a drive surface of the rotating platform and, via at least one drive wheel act on the drive surface so as to cause the rotating platform to perform said movement, and the method further comprises at least one of:
preventing operation of the rotating platform, reducing a maximum steady-state speed of the rotating platform, and
issuing an inspection/service alarm in response to the first alarm (A1).

13. The method according to claim 12, wherein, each of the at least one drive unit comprises a single drive motor arranged to engage the drive surface of the rotating platform in a non-disengageable manner.

14. The method according to claim 12, wherein, each of the at least one drive unit comprises first and second drive motors arranged to engage two of said drive surfaces in the form of a drive rail of the rotating platform and, via respective drive wheels act on a respective side of the drive rail so as to cause the rotating platform to perform said movement, and in response to the first alarm (A1), the method further comprises:

sending a first control signal (C2) to the one or more detected drive units, which first control signal (C2) is configured to cause the one or more detected drive units to be disengaged from the drive rail.

15. The method according to claim 11, wherein the first operation parameter represents a respective magnitude of an electric current fed to each of the at least one drive unit or a respective torque of each of the at least one drive unit in the first and second states respectively.

16. The method according to claim 11, wherein the rotary milking parlor arrangement comprises at least three drive units, and wherein when the difference between said first and second states exceeds the threshold level for each of the at least three drive units, the method further comprises:

obtaining, during operation of the rotating platform in the second mode of operation, the first operation parameter for each of the at least three drive units, comparing, pairwise, the first operation parameter for each of the at least three drive units with the first operation parameter for each of the other drive units of the at least three drive units to derive a respective first difference value between each combination of drive units of the at least three drive units, and based on said first difference values determine when the first operation parameter for a particular one deviates from the first operation parameter for the other ones of the at least three drive units by more than a first threshold difference, and then generating a second alarm (A2) with respect to said particular one drive unit.

17. A non-transitory computer readable medium on which is stored a computer program which, when executed by a processing unit, causes the processing unit to perform a method of operating a rotary milking parlor arrangement that comprises a rotating platform with a plurality of stalls (S), each stall configured to house a respective animal during milking, the rotary milking parlor arrangement further comprising at least one drive unit configured to cause the rotating platform to move in at least a first direction (RF, RB) of rotation around a rotation axis (P), the method comprising:

obtaining a respective first state of a first operation parameter of each of the at least one drive unit during operation of the rotating platform in a first mode of operation;

obtaining a respective second state of the first operation parameter of each of the at least one drive unit during operation of the rotating platform in a second mode of operation; and comparing, for each of the at least one drive unit, the first and second states of the first operation parameter with one another, and when, for one or more detected drive units of the at least one drive unit, a difference between said first and second states does not exceed a threshold level, generating a first alarm (A1) with respect to the one or more detected drive units, wherein:

the first mode of operation involves operating the at least one drive unit in an idle mode in which no drive motor of any of the at least one drive unit is engaged to cause the rotating platform to move in the at least first direction (RF, RB) of rotation around the rotation axis (P); and the second mode of operation involves operating the at least one drive unit in a steady-state mode in which the at least one drive unit is engaged to cause the rotating platform to move at a steady-state speed in the at least first direction (RF, RB) of rotation around the rotation axis (P).

* * * * *